United States Patent
Poirier

(10) Patent No.: US 11,643,220 B2
(45) Date of Patent: May 9, 2023

(54) ELECTRICITY PRODUCTION SYSTEM FOR AN AIRCRAFT, COMPRISING A FUEL CELL

(71) Applicant: Airbus SAS, Blagnac (FR)

(72) Inventor: Didier Poirier, Blagnac (FR)

(73) Assignee: AIRBUS SAS, Blagnac (FR)

( * ) Notice: Subject to any disclaimer, the term of this patent is extended or adjusted under 35 U.S.C. 154(b) by 373 days.

(21) Appl. No.: 16/921,150

(22) Filed: Jul. 6, 2020

(65) Prior Publication Data
US 2021/0009280 A1   Jan. 14, 2021

(30) Foreign Application Priority Data
Jul. 12, 2019   (FR) ...................................... 1907856

(51) Int. Cl.
| | |
|---|---|
| B64D 41/00 | (2006.01) |
| B60L 50/70 | (2019.01) |
| B64D 27/24 | (2006.01) |
| H01M 8/04746 | (2016.01) |

(52) U.S. Cl.
CPC .............. *B64D 41/00* (2013.01); *B60L 50/70* (2019.02); *B64D 27/24* (2013.01); *H01M 8/04753* (2013.01); *B60L 2200/10* (2013.01); *B64D 2041/005* (2013.01); *H01M 2250/20* (2013.01)

(58) Field of Classification Search
CPC ... H01M 8/04753; B64D 41/00; B64D 27/24; B60L 50/70
USPC ...................................................... 429/444
See application file for complete search history.

(56) References Cited

U.S. PATENT DOCUMENTS

| | | | |
|---|---|---|---|
| 2004/0118969 A1* | 6/2004 | MacCready | .............. B64C 1/26 244/5 |
| 2004/0151964 A1 | 8/2004 | Finger et al. | |
| 2004/0247966 A1 | 12/2004 | Stute | |
| 2011/0097632 A1 | 4/2011 | Sumser et al. | |
| 2015/0188161 A1 | 7/2015 | Kwon et al. | |
| 2015/0349359 A1 | 12/2015 | Asai et al. | |
| 2016/0167796 A1 | 6/2016 | Joubert et al. | |

(Continued)

FOREIGN PATENT DOCUMENTS

| | | |
|---|---|---|
| DE | 102008018863 A1 | 10/2009 |
| EP | 2940768 A1 | 11/2015 |
| JP | 2009123550 A | 6/2009 |

OTHER PUBLICATIONS

French Search Report; priority document.

*Primary Examiner* — James M Erwin
(74) *Attorney, Agent, or Firm* — Greer, Burns & Crain, Ltd.

(57) ABSTRACT

An electricity production system for an aircraft comprising a fuel cell, with an anode and a cathode, supplying an electric motor, a first feed pipe between the anode and a hydrogen source, a compressor, a second feed pipe between the inlet of the compressor and an oxygen source, a first transfer pipe between the outlet of the compressor and the cathode, a valve, an upstream pipe between the outlet of the compressor and the valve, a downstream pipe between the valve and an air outlet, and a controller which controls the position of the valve and the flow rate of the compressor. Such an electricity production system thus provides better control of the air flow supplied to the fuel cell on the basis of the electrical power required for the electric motor providing propulsion.

7 Claims, 6 Drawing Sheets

(56) References Cited

U.S. PATENT DOCUMENTS

2016/0218383 A1 7/2016 Hanschke et al.
2018/0277869 A1* 9/2018 Kusano ............... H01M 8/0267

* cited by examiner

ELECTRICITY PRODUCTION SYSTEM FOR AN AIRCRAFT, COMPRISING A FUEL CELL

CROSS-REFERENCES TO RELATED APPLICATIONS

This application claims the benefit of the French patent application No. 1907856 filed on Jul. 12, 2019, the entire disclosures of which are incorporated herein by way of reference.

BACKGROUND OF THE INVENTION

The present invention relates to an electricity production system which comprises a fuel cell and which is implemented in an aircraft, and also to an aircraft comprising a propeller propulsion system with an electric motor and such an electricity production system supplying the electric motor.

FIELD OF THE INVENTION

In order to move, an aircraft comprises a propulsion system comprising a motor and a propeller. The motor generates a rotary movement which is transmitted to the propeller.

It is known to use an electric motor to cause the propeller to move. It is also proposed that an electricity production system comprising fuel cells be used to generate the electricity required for supplying the electric motor.

A fuel cell is a cell in which the generation of an electrical potential takes place as a result of the oxidation on an electrode of a reducing fuel, such as hydrogen, coupled to the reduction on the other electrode of an oxidizer, such as oxygen from the air.

FIG. 3 shows a prior art electricity production system 300 which comprises a fuel cell 302 with an anode 302a and a cathode 302b.

A set of electrical conductors 52 is electrically supplied by the fuel cell 302 to electrically supply an electrical load.

The production system 300 is fluidically connected to a hydrogen source 304, typically a hydrogen tank which supplies the fuel cell 302 with hydrogen at the anode 302a. For this purpose, the production system 300 comprises a first feed pipe 306a, which is fluidically connected between the hydrogen source 304 and the anode 302a. The production system 300 further comprises a first discharge pipe 306b, through which the hydrogen not consumed by the anode 302a is extracted from the anode 302a.

The production system 300 is fluidically connected to an oxygen source 310, typically air.

The production system 300 comprises a treatment system 320 which treats the air collected from the oxygen source 310 and sent to the cathode 302b.

The treatment system 320 comprises a compressor 324, a turbine 326 and an additional electric motor 330 which drives the rotating part of the compressor 324 in rotation. As explained below, the rotating part of the turbine 326 is itself driven in rotation by the air leaving the fuel cell 302. Additionally, the rotating part of the compressor 324 and the rotating part of the turbine 326 are fixed to one another by means of a transmission shaft 328 in order to ensure that the rotation of the rotating part of the turbine 326 drives the rotating part of the compressor 324 in rotation in a complementary way to the additional electric motor 330.

The production system 300 comprises a second feed pipe 322a, which is fluidically connected between the oxygen source 310 and the inlet of the compressor 324.

The treatment system 320 comprises a heat exchanger 332, a humidifier 334 and an air/water separator 342. Conventionally, the heat exchanger 332 comprises a first and a second inlet and a first and a second outlet. Conventionally, the humidifier 334 comprises a first and a second inlet and a first and a second outlet. Conventionally, the air/water separator 342 comprises an inlet, in addition to a first outlet for the air and a second outlet for the water.

The treatment system 320 comprises a first transfer pipe 336 fluidically connected between the outlet of the compressor 324 and the first inlet of the heat exchanger 332, a second transfer pipe 338 fluidically connected between the first outlet of the heat exchanger 332 and the first inlet of the humidifier 334, and a third transfer pipe 340 fluidically connected between the first outlet of the humidifier 334 and the cathode 302b.

The production system 300 further comprises a fourth transfer pipe 344 through which the oxygen-depleted air is extracted from the cathode 302b, the fourth transfer pipe 344 being fluidically connected to the inlet of the air/water separator 342.

The treatment system 320 comprises a fifth transfer pipe 346 fluidically connected between the first outlet of the air/water separator 342 and the second inlet of the humidifier 334, a sixth pipe 348 fluidically connected between the second outlet of the humidifier 334 and the second inlet of the heat exchanger 332, and a seventh transfer pipe 350 fluidically connected between the second outlet of the heat exchanger 332 and the inlet of the turbine 326. The oxygen-depleted air received from the cathode 302b then drives the rotating part of the turbine 326 in rotation.

The humidifier 334 enables the water that is still present in the air received from the air/water separator 342 to be transferred towards the air received from the heat exchanger 332.

The production system 300 further comprises a second discharge pipe 322b, fluidically connected to the outlet of the turbine 326. The second discharge pipe 322b guides the air towards an air outlet 352.

The production system 300 further comprises a third discharge pipe 322c, fluidically connected to the second outlet of the air/water separator 342 for discharging the water.

The air collected from the oxygen source 310 passes successively through the compressor 324, the heat exchanger 332, and the humidifier 334, to reach the cathode 302b. The air then continues along its path towards the air/water separator 342, the humidifier 334, the heat exchanger 332, the turbine 326 and the air outlet 352.

Although such an installation is entirely satisfactory, it is necessary to find a novel installation which is suited to supplying electricity to an electric propulsion motor of an aircraft and which enables the air flow supplied to the fuel cell to be controlled on the basis of the electrical power required for the electric propulsion motor.

SUMMARY OF THE INVENTION

One object of the present invention is to propose an electricity production system which comprises a fuel cell and which is implemented in an aircraft, and in which the oxygen flow rate supplying the cathode may be controlled.

For this purpose, an electricity production system for an aircraft is proposed, comprising an electric motor, a propeller driven in rotation by the electric motor, electrical conductors electrically supplying the electric motor, a hydrogen source and an oxygen source, wherein the electricity production system comprises:
- a fuel cell with an anode and a cathode, and in which the fuel cell is intended to electrically supply the electrical conductors,
- a first feed pipe fluidically connected to the anode and intended to be fluidically connected to the hydrogen source,
- an additional electric motor,
- a compressor whose rotating part is driven in rotation by the additional electric motor,
- a second feed pipe fluidically connected to the inlet of the compressor and intended to be fluidically connected to the oxygen source,
- a first transfer pipe fluidically connected between the outlet of the compressor and the cathode,
- a valve that can assume different positions between an open position and a closed position,
- an upstream pipe fluidically connected between the outlet of the compressor and the valve,
- a downstream pipe fluidically connected between the valve and an air outlet, and
- a control unit (controller) configured for controlling the position of the valve and the flow rate of the compressor.

Such an electricity production system thus provides better control of the air flow supplied to the fuel cell on the basis of the electrical power required for the electric motor providing propulsion. In particular, such a system makes it possible to decouple the control of the air flow supplied to the fuel cell from, on the one hand, the control signal of the compressor flow rate, and, on the other hand, the actual compressor flow rate, this real flow rate allowing for a response time of the compressor following the acceptance of a flow rate control signal.

Advantageously, the electricity production system comprises a pressure sensor arranged at the cathode and communicating with the control unit.

Advantageously, the electricity production system further comprises a turbine, a transmission shaft fixed between the rotating part of the compressor and the rotating part of the turbine, and a second transfer pipe fluidically connected between the cathode and the inlet of the turbine, and the downstream pipe is divided into a first downstream pipe fluidically connected between the valve and the inlet of the turbine and a second downstream pipe fluidically connected between the outlet of the turbine and the air outlet.

Advantageously, the electricity production system further comprises a heat exchanger with a first and a second inlet and a first and a second outlet, a humidifier with a first and a second inlet and a first and a second outlet, and an air/water separator with an inlet, a first outlet for the air and a second outlet for the water, the first transfer pipe being divided into a first part fluidically connected between the outlet of the compressor and the first inlet of the heat exchanger, a second part fluidically connected between the first outlet of the heat exchanger and the first inlet of the humidifier, and a third part fluidically connected between the first outlet of the humidifier and the cathode, and the second transfer pipe being divided into a first part fluidically connected between the cathode and the inlet of the air/water separator, a second part fluidically connected between the first outlet of the air/water separator and the second inlet of the humidifier, a third part fluidically connected between the second outlet of the humidifier and the second inlet of the heat exchanger, and a fourth part fluidically connected between the second outlet of the heat exchanger and the inlet of the turbine.

Advantageously, the electricity production system comprises a flow meter in communication with the control unit and arranged at the outlet of the compressor or at the inlet of the turbine, and the turbine has a variable injection cross section at its inlet.

Advantageously, the control unit is configured for controlling the position of the valve and the compressor flow rate, according to, alternatively, a first operating mode in which the valve is closed and the compressor flow rate corresponds to a flow rate required for supplying oxygen to the fuel cell; or a second operating mode in which the compressor flow rate is equal to the flow rate required for supplying oxygen to the fuel cell, supplemented by an additional oxygen flow rate, and the valve is open so that the additional oxygen flow rate is discharged through the valve.

Advantageously, the control unit is configured for controlling the position of the valve and the compressor flow rate according to the second operating mode when the flow rate required for supplying oxygen to the fuel cell is below a minimum flow rate corresponding to a minimum reduced flow rate for operation of the compressor without pumping, and the control unit controls a compressor flow rate greater than or equal to this minimum flow rate.

Advantageously, the control unit is configured for acquiring information on the flight phase of the aircraft, and for controlling the position of the valve and the compressor flow rate according to the second operating mode when the information on the flight phase of the aircraft corresponds to a flight phase during which the aircraft may have to perform a maneuver that requires an increase in the electrical power supplied by the fuel cell, and the control unit controls a compressor flow rate greater than or equal to a flow rate required for supplying oxygen to the fuel cell so that an electrical power corresponding to this maneuver can be supplied by the fuel cell.

The invention also proposes an aircraft comprising an electric motor, a propeller driven in rotation by the electric motor, electrical conductors electrically supplying the electric motor, a hydrogen source, an oxygen source, and an electricity production system according to the preceding variant.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
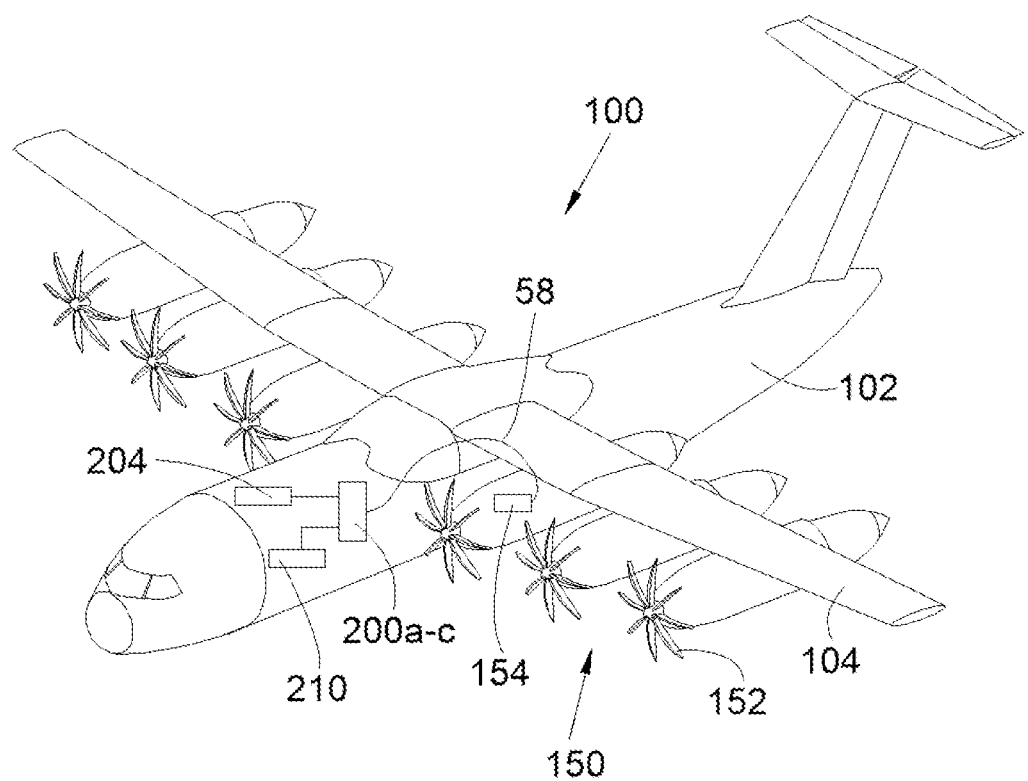
FIG. 1 is a perspective view of an aircraft comprising a plurality of electrical propeller propulsion systems according to the invention.

FIG. 1 shows an aircraft 100 which has a fuselage 102 on either side of which is fixed a wing 104. At least one propeller propulsion system 150 is fixed under each wing 104. In the embodiment of the invention shown in FIG. 1, there are three propulsion systems 150 for each wing 104.

Each propulsion system 150 comprises an electric motor 154 and a propeller 152 which is driven in rotation by the electric motor 154. The electric motor 154 is supplied with electricity by an electricity production system 200a-c according to the invention.

In the embodiment of the invention shown in FIG. 1, the electricity production system 200a-c is placed in the fuselage 102, but it may be arranged in the wing or in the propulsion system 150. Similarly, there may be an electricity production system 200a-c for each electric motor 154 or for a plurality of electric motors 154.

Figure 2A:
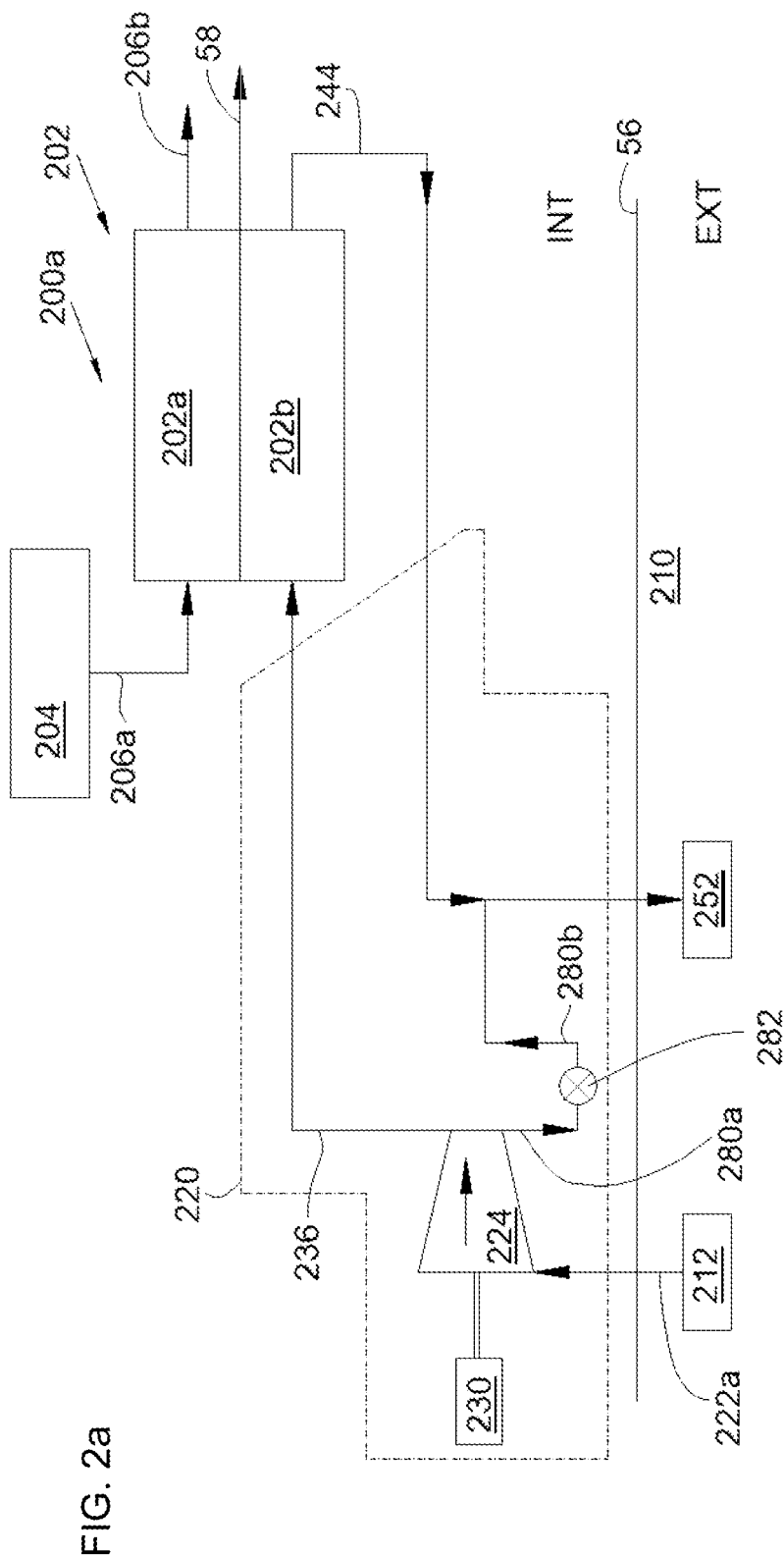
FIG. 2a is a schematic representation of an electricity production system according to a first embodiment of the invention.
Figure 2B:
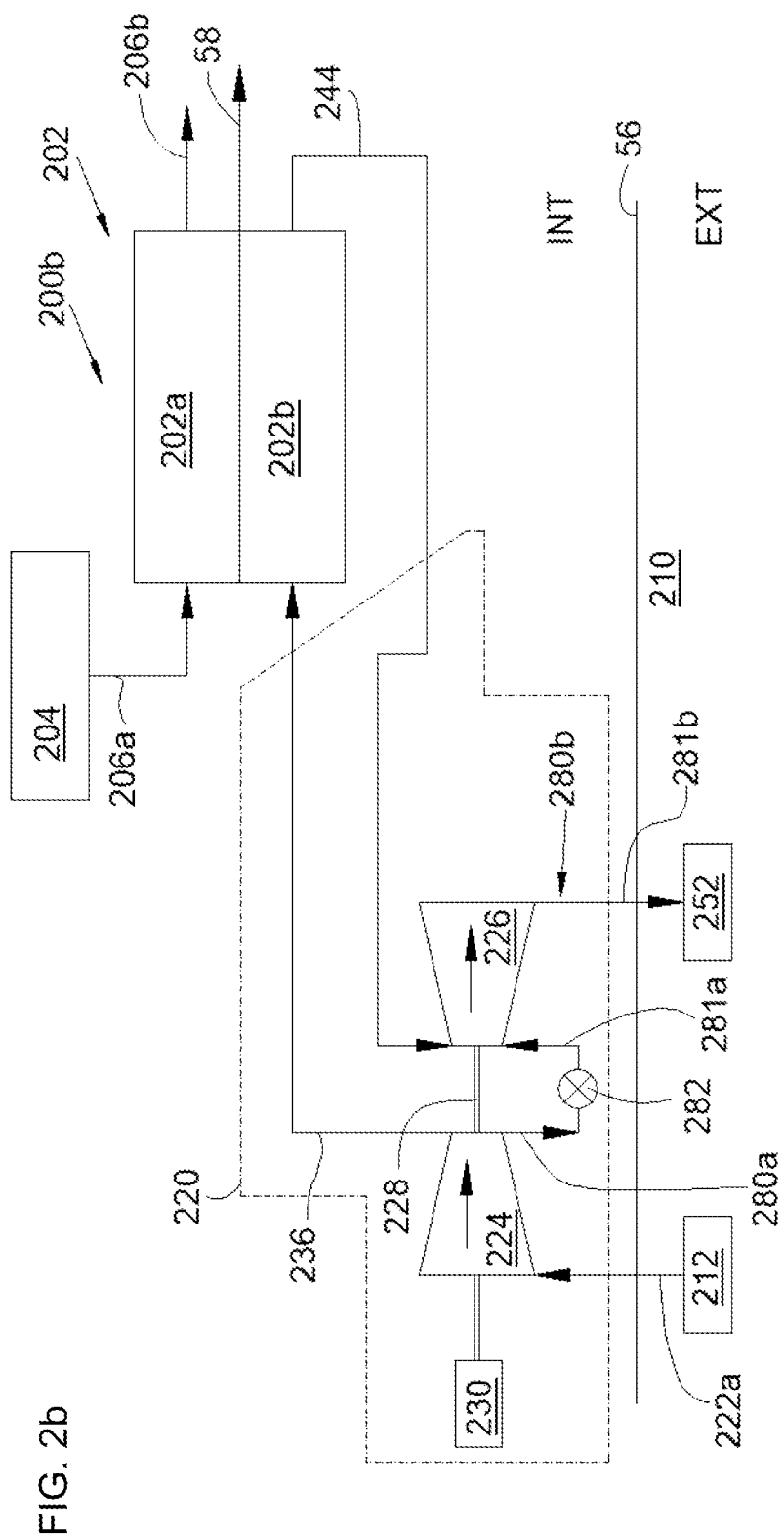
FIG. 2b is a schematic representation of an electricity production system according to a second embodiment of the invention.
Figure 2C:
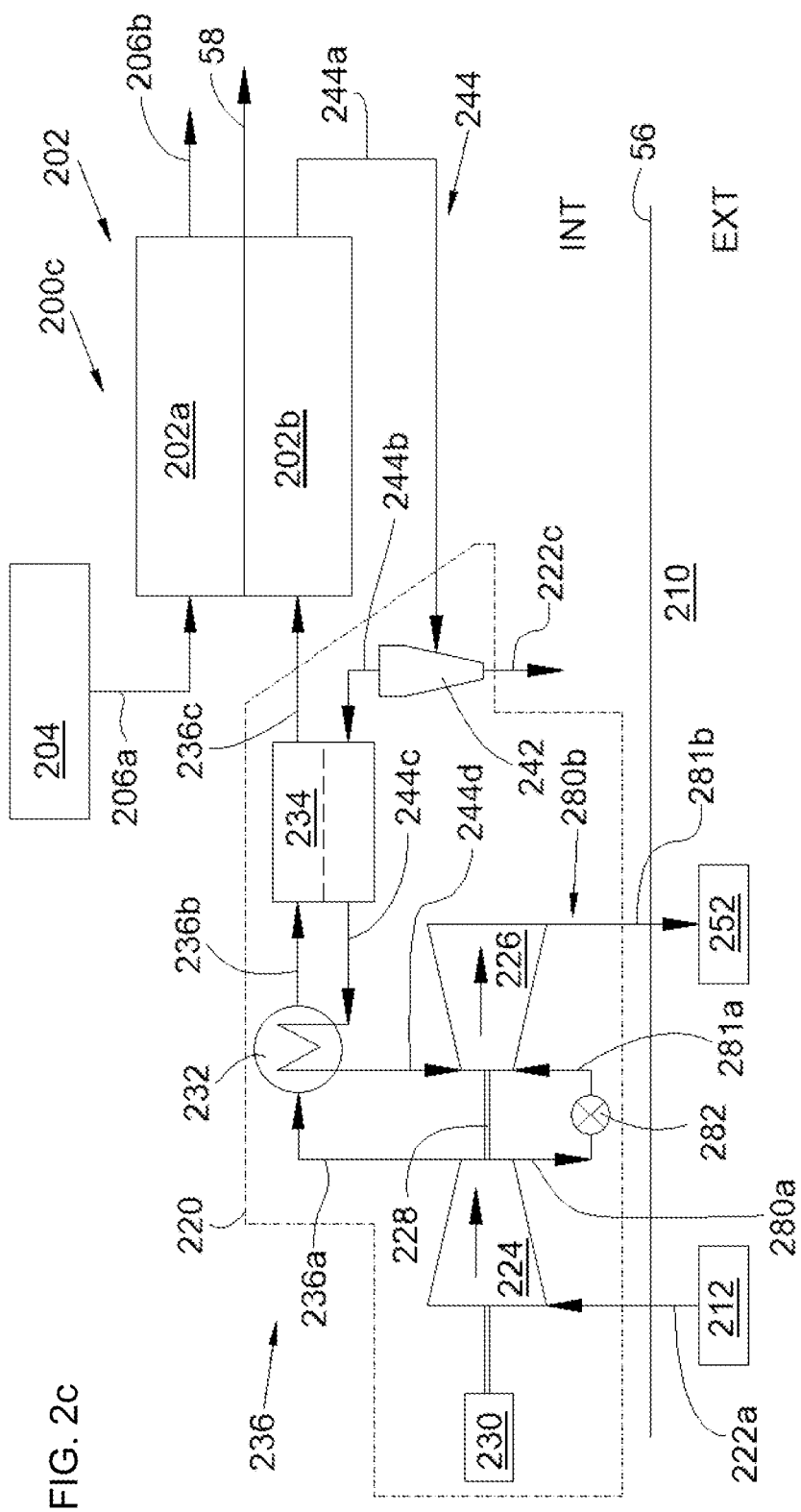
FIG. 2c is a schematic representation of an electricity production system according to a third embodiment of the invention.
Figure 3:
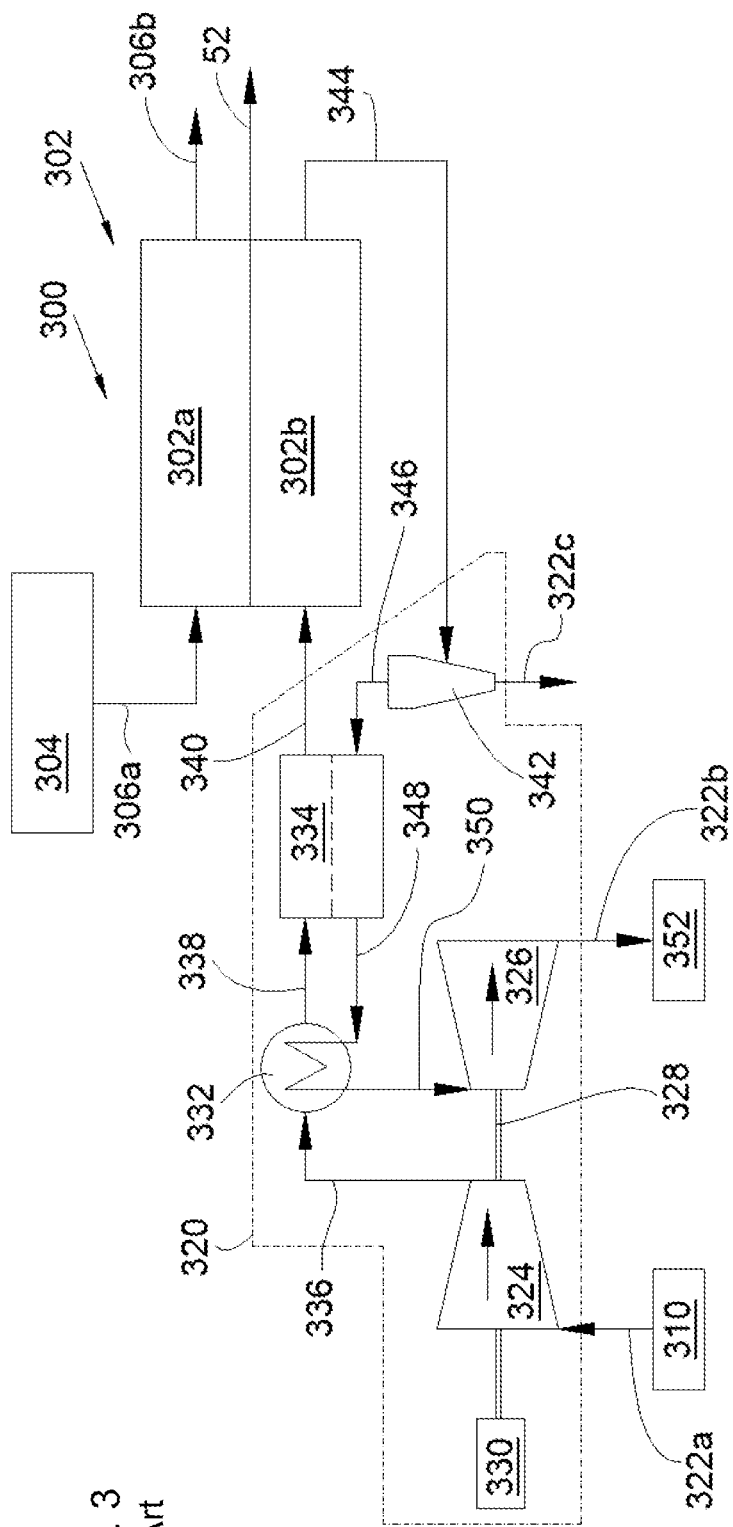
FIG. 3 is a schematic representation of a prior art electricity production system.

FIG. 2a shows an electricity production system 200a according to a first embodiment of the invention, FIG. 2b shows an electricity production system 200b according to a second embodiment of the invention, and FIG. 2c shows an electricity production system 200b according to a third embodiment of the invention.

Members common to the three embodiments carry the same references.

The electricity production system 200a-c comprises a fuel cell 202 with an anode 202a and a cathode 202b. The production system 200a-c is implemented in the context of an aircraft in which the line referenced 56 represents the skin separating the interior (INT) from the exterior (EXT) of the aircraft 100.

The aircraft 100 further comprises electrical conductors 58 which are electrically supplied by the fuel cell 202 to electrically supply the electric motor 154 of the propulsion system 150.

The production system 200a-c is fluidically connected to a hydrogen source 204 of the aircraft 100, typically a hydrogen tank which supplies the fuel cell 202 with hydrogen at the anode 202a. For this purpose, the production system 200a-c comprises a first feed pipe 206a, which is fluidically connected between the hydrogen source 204 and the anode 202a. The production system 200a-c further comprises a first discharge pipe 206b, through which the hydrogen not consumed by the anode 202a is extracted from the anode 202a.

The aircraft 100 comprises an oxygen source 210, typically the exterior air of the aircraft. For this purpose, the aircraft 100 comprises a collection system 212, typically a scoop in the skin 56, which collects air from the exterior.

The production system 200a-c comprises a treatment system 220 which treats the air collected by the collection system 212 and sent to the cathode 202b.

The treatment system 220 comprises a compressor 224 and an additional electric motor 230 which drives the rotating part of the compressor 224 in rotation.

The production system 200a-c comprises a second feed pipe 222a, which is fluidically connected between the oxygen source 210, in this case the collection system 212, and the inlet of the compressor 224.

The treatment system 220 comprises a first transfer pipe 236 fluidically connected between the outlet of the compressor 224 and the cathode 202b.

The production system 200a-c further comprises a second transfer pipe 244 through which the air depleted in oxygen by the cathode 202b is extracted from the cathode 202b.

In the first embodiment, the air in the second transfer pipe 244 is discharged. The air may thus be discharged, to the exterior for example, through an air outlet 252 in the skin 56.

The air collected at the collection system 212 passes through the compressor 224 to reach the cathode 202b.

The production system 200a-c further comprises a valve 282, an upstream pipe 280a fluidically connected between the outlet of the compressor 224 and the valve 282, and a downstream pipe 280b fluidically connected between the valve 282 and an air outlet 252, in the skin 56 for example, thus providing a deviation known as a "by-pass" relative to the cathode 202b.

The production system 200a-c further comprises a control unit (controller 203), which may be a control unit of the aircraft 100, and which controls the position of the valve 282, which may assume different positions between an open position, allowing the passage of at least some of the air directly between the compressor 224 and the air outlet 252, and a closed position, forcing the air to pass through the cathode 202b.

As explained below, this valve 282 allows the air flow towards the cathode 202b to be regulated according to the required electrical power to be supplied by the combustion cell 202.

Figure 4:
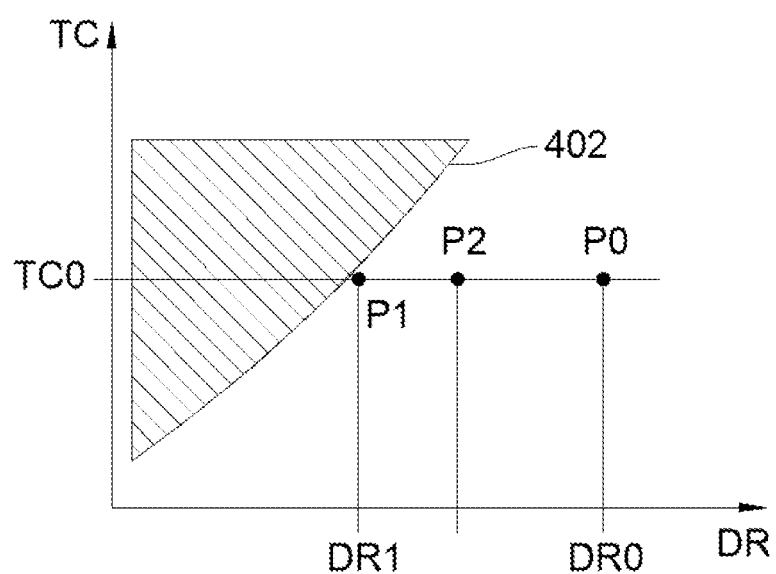
FIG. 4 is a pumping curve of a compressor.

The control unit 203 also controls the flow rate of the compressor 224, by controlling the rotation speed of the additional electric motor 230 and the injection cross section of the turbine 226 when the latter is present, as described below. As shown in FIG. 4, which represents a pumping curve of the compressor 224, the adjustments of the flow rate and of the compression rate are linked.

In particular, the speed of the additional electric motor 230 is controlled so as to regulate the pressure at the inlet of the cathode 202b, for example by using a pressure sensor 202c arranged at the cathode 202b and in communication with the control unit 203.

In the embodiment of FIG. 2b, the treatment system 220 further comprises a turbine 226. As explained below, the rotating part of the turbine 226 is itself driven in rotation by the air leaving the fuel cell 202, in order to assist the additional electric motor 230.

For this purpose, the rotating part of the compressor 224 and the rotating part of the turbine 226 are fixed to one another by means of a transmission shaft 228, to make the rotation of the rotating part of the turbine 226 drive the rotation of the rotating part of the compressor 224.

The downstream pipe 280b is divided into a first downstream pipe 281a fluidically connected between the valve 282 and the inlet of the turbine 226 and a second downstream pipe 281b fluidically connected between the outlet of the turbine 226 and the air outlet 252.

Additionally, the second transfer pipe 244 is fluidically connected between the cathode 202b and the inlet of the turbine 226. The second transfer pipe 244 is thus fluidically connected to the air outlet 252 via the turbine 226. The oxygen-depleted air received from the cathode 202b then drives the rotating part of the turbine 226 in rotation.

In the embodiment of FIG. 2c, the treatment system 220 comprises, in addition to the turbine 226, a heat exchanger 232, a humidifier 234 and an air/water separator 242. Conventionally, the heat exchanger 232 comprises a first and a second inlet and a first and a second outlet. Conventionally, the humidifier 234 comprises a first and a second inlet and a first and a second outlet. Conventionally, the air/water separator 242 comprises an inlet, in addition to a first outlet for the air and a second outlet for the water.

The heat exchanger 232, the humidifier 234 and the air/water separator 242 enable the efficiency of the reaction between the oxygen and the cathode 202b to be improved.

In this second embodiment, the first transfer pipe 236 is divided into a first part 236a fluidically connected between the outlet of the compressor 224 and the first inlet of the heat exchanger 232, a second part 236b fluidically connected between the first outlet of the heat exchanger 232 and the first inlet of the humidifier 234, and a third part 236c fluidically connected between the first outlet of the humidifier 234 and the cathode 202b.

Additionally, the second transfer pipe 244 is divided into a first part 244a fluidically connected between the cathode 202b and the inlet of the air/water separator 242, a second part 244b fluidically connected between the first outlet of the air/water separator 242 and the second inlet of the humidifier 234, a third part 244c fluidically connected between the second outlet of the humidifier 234 and the second inlet of the heat exchanger 232, and a fourth part 244d fluidically connected between the second outlet of the heat exchanger 232 and the inlet of the turbine 226.

The humidifier 234 enables the water that is still present in the air received from the air/water separator 242 to be transferred towards the air received from the heat exchanger 222.

The aircraft further comprises a second discharge pipe 222c, fluidically connected to the second outlet of the air/water separator 242 for discharging the water. In particular, the discharged water may be stored in a tank.

The air collected at the collection system 212 passes successively through the compressor 224, the heat exchanger 232 and the humidifier 234 to reach the cathode 202b. The air then continues along its path towards the air/water separator 242, the humidifier 234, the heat exchanger 232, the turbine 226 and the air outlet 252.

In the embodiments of FIGS. 2b-c, the total flow rate passing through the compressor 224 is also controlled by a variable injection cross section which is present at the inlet of the turbine 226. The larger the cross section, the greater is the mass flow rate. To control this injection cross section, a flow meter 205 is arranged at the outlet of the compressor 224 or at the inlet of the turbine 226, and this flow meter is also in communication with the control unit 203.

FIG. 4 shows a pumping curve of a compressor, showing the compression rate TC as a function of the reduced flow rate DR. To prevent the compressor from pumping, it must operate in the area below the pumping curve 402 of the compressor 224.

The reduced flow rate depends on the power used at the output of the fuel cell.

For a given compression rate TC0 and a given used power corresponding to a reduced rate DR0, the operating point is the point P0.

When the power used at the output of the fuel cell 202 decreases, due to the reduction of the speed of the electric motor 154 for example, the reduced rate decreases towards DR1, and the operating point P0 then shifts to the left at P1, approaching the pumping curve 402.

In such a situation, and in the context of the invention, the valve 282 is set to open to create an artificial consumption of air at the outlet of the compressor 224, thereby at least partially compensating the reduction in air consumption by the fuel cell 202.

The actual operating point is then at P2, which is farther from the pumping curve 402 than the operating point P1.

Evidently, the position of the operating point P2 may be optimized. For example, an increase in the reduced rate tends to increase the compression work to be provided by the compressor 324, which tends to shift the operating point of the compressor for better isentropic efficiency, and this excess in the reduced rate will pass through the turbine 326 and enable some of the compression work to be recovered.

In another operating mode, when the power used at the output of the fuel cell increases, for example if there is an increase in the torque produced by the electric motor 154, the air flow rate through the compressor 224 has to be increased rapidly, but the inertia of the compressor 224 limits this rapid increase in the air flow rate. This operating mode is particularly suitable when very high acceleration is required.

Thus, in the phases of flight for which a rapid increase in the power used at the output of the fuel cell may be required, the valve 282 is set to open and the compressor 224 is set to operate with this additional air flow rate passing through the valve 282.

If an increase in power is required, the valve 282 is set to close, thereby immediately increasing the air flow supplied to the fuel cell 202 and therefore resulting in an increase in power.

The control unit is configured for controlling the position of the valve 282 and the flow rate of the compressor 224, according to, alternatively, a first operating mode in which the valve 282 is closed and the flow rate of the compressor 224 corresponds to a flow rate required for supplying oxygen to the fuel cell 202; or a second operating mode in which the flow rate of the compressor 224 is equal to the flow rate required for supplying oxygen to the fuel cell 202, supplemented by an additional oxygen flow rate, and the valve 282 is open so that the additional oxygen flow rate is discharged through the valve 282.

According to a particular embodiment, the control unit 203 is configured for controlling the position of the valve 282 and the flow rate of the compressor 224 according to the second operating mode when the flow rate required for supplying oxygen to the fuel cell 202 is below a minimum flow rate corresponding to a minimum reduced flow rate DR1 for operation of the compressor 224 without pumping, and the control unit 203 sets a flow rate of the compressor 224 greater than or equal to this minimum flow rate. This allows the compressor 224 to operate without pumping, even when the flow rate required for supplying oxygen to the fuel cell 202 is less than the minimum flow rate corresponding to the minimum reduced flow rate DR1.

According to a particular embodiment, the control unit 203 is configured for acquiring information on the flight phase of the aircraft 100, and for controlling the position of the valve 282 and the flow rate of the compressor 224 according to the second operating mode when the information on the flight phase of the aircraft corresponds to a flight phase during which the aircraft 100 may have to perform a maneuver that requires an increase in the electrical power supplied by the fuel cell 202, and the control unit 203 sets a flow rate of the compressor 224 greater than or equal to a flow rate required for supplying oxygen to the fuel cell 202 so that an electrical power corresponding to this maneuver can be supplied by the fuel cell 202.

Thus, during such a flight phase, as long as the maneuver is not required, the control unit 203 sets a first open or partially open position of the valve 282, so as to discharge via the valve 282 some of the air flow leaving the outlet of the compressor 224. This makes it possible to send to the fuel cell 202 only the air flow corresponding to the electrical power required for the electric motor 154 providing propulsion in the absence of such a maneuver. When the aircraft 100 has to perform a maneuver requiring an increase in the electrical power supplied by the fuel cell 202, the control unit sets a second position of the valve 282, which is more closed than the first position, so as to reduce the air flow discharged via the valve 282 and thereby increase the air flow sent to the fuel cell 202. This makes it possible to increase rapidly the air flow sent to the fuel cell 202, so as to enable the fuel cell 202 to supply the electrical power required for performing this maneuver. In the absence of the valve 282, it would be impossible to make such a rapid increase in the air flow simply by increasing the flow rate of the compressor 224, because of the inertia of the compressor 224.

The maneuver requiring an increase in the electrical power supplied by the fuel cell 202 may, for example, be what is known as a go-around maneuver during a landing phase, or an avoidance maneuver when a warning is emitted by an anti-collision system such as a TCAS ("Traffic Collision Avoidance System"). The acquisition of the information on the flight phase consists, for example, in a detection of a landing phase by reception of information sent by a flight control computer of the aircraft, or by the detection of the deployment of the undercarriage of the aircraft 100. In such a landing phase, a go-around maneuver may require a rapid increase in the electrical power supplied by the fuel cell. In another example, the acquisition of the information on the flight phase corresponds to the reception of information on the descent phase of the aircraft 100, sent by a flight control computer of the aircraft 100. In such a landing phase of the aircraft 100, a collision avoidance maneuver in the presence of a TCAS warning may require a rapid increase in the electrical power supplied by the fuel cell 202.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electricity production system for an aircraft comprising an electric motor, a propeller driven in rotation by the electric motor, electrical conductors electrically supplying the electric motor, a hydrogen source and an oxygen source, wherein said electricity production system comprises:
   a fuel cell with an anode and a cathode, and in which the fuel cell is configured to electrically supply the electrical conductors,
   a first feed pipe fluidically connected to the anode and configured to be fluidically connected to the hydrogen source,
   an additional electric motor,
   a compressor whose rotating part is driven in rotation by the additional electric motor,
   a second feed pipe fluidically connected to an inlet of the compressor and configured to be fluidically connected to the oxygen source,
   a first transfer pipe fluidically connected between an outlet of the compressor and the cathode,
   a valve configured to assume different positions between an open position and a closed position,
   an upstream pipe fluidically connected between the outlet of the compressor and the valve,
   a downstream pipe fluidically connected between the valve and an air outlet, and
   a controller configured to control a position of the valve and a flow rate of the compressor,
   wherein the controller is configured to control the position of the valve and the flow rate of the compressor, according to, alternatively, a first operating mode in which the valve is closed and the flow rate of the compressor corresponds to a flow rate required for supplying oxygen to the fuel cell; or a second operating mode in which the flow rate of the compressor is equal to the flow rate required for supplying oxygen to the fuel cell, supplemented by an additional oxygen flow rate, and the valve is open so that the additional oxygen flow rate is discharged through the valve,
   wherein the controller is configured to control the position of the valve and the flow rate of the compressor according to the second operating mode when the flow rate required for supplying oxygen to the fuel cell is below a minimum flow rate corresponding to a minimum reduced flow rate for operation of the compressor without pumping, and the controller sets a flow rate of the compressor greater than or equal to this minimum flow rate.

2. The electricity production system according to claim 1, wherein the controller is configured to acquire information on a flight phase of the aircraft, and to control the position of the valve and the flow rate of the compressor according to the second operating mode when the information on the flight phase of the aircraft corresponds to a flight phase during which the aircraft may have to perform a maneuver that requires an increase in electrical power supplied by the fuel cell, and
   wherein the controller sets a flow rate of the compressor greater than or equal to a flow rate required for supplying oxygen to the fuel cell so that an electrical power corresponding to this maneuver can be supplied by the fuel cell.

3. The electricity production system according to claim 1, further comprising a pressure sensor arranged at the cathode and communicating with the controller.

4. The electricity production system according to claim 1, further comprising a turbine, a transmission shaft fixed between the rotating part of the compressor and the rotating part of the turbine, and a second transfer pipe fluidically connected between the cathode and the inlet of the turbine, and wherein the downstream pipe is divided into a first downstream pipe fluidically connected between the valve and the inlet of the turbine and a second downstream pipe fluidically connected between the outlet of the turbine and the air outlet.

5. An electricity production system for an aircraft comprising an electric motor, a propeller driven in rotation by the electric motor, electrical conductors electrically supplying the electric motor, a hydrogen source and an oxygen source, wherein said electricity production system comprises:

a fuel cell with an anode and a cathode, and in which the fuel cell is configured to electrically supply the electrical conductors, a first feed pipe fluidically connected to the anode and configured to be fluidically connected to the hydrogen source, an additional electric motor, a compressor whose rotating part is driven in rotation by the additional electric motor, a second feed pipe fluidically connected to an inlet of the compressor and configured to be fluidically connected to the oxygen source, a first transfer pipe fluidically connected between an outlet of the compressor and the cathode, a valve configured to assume different positions between an open position and a closed position, an upstream pipe fluidically connected between the outlet of the compressor and the valve, a downstream pipe fluidically connected between the valve and an air outlet, and a controller configured to control a position of the valve and a flow rate of the compressor, wherein the controller is configured to control the position of the valve and the flow rate of the compressor, according to, alternatively, a first operating mode in which the valve is closed and the flow rate of the compressor corresponds to a flow rate required for supplying oxygen to the fuel cell; or a second operating mode in which the flow rate of the compressor is equal to the flow rate required for supplying oxygen to the fuel cell, supplemented by an additional oxygen flow rate, and the valve is open so that the additional oxygen flow rate is discharged through the valve, a turbine, a transmission shaft fixed between the rotating part of the compressor and the rotating part of the turbine, and a second transfer pipe fluidically connected between the cathode and the inlet of the turbine, and wherein the downstream pipe is divided into a first downstream pipe fluidically connected between the valve and the inlet of the turbine and a second downstream pipe fluidically connected between the outlet of the turbine and the air outlet, a heat exchanger with a first and a second inlet and a first and a second outlet, a humidifier with a first and a second inlet and a first and a second outlet, and an air/water separator with an inlet, a first outlet for air and a second outlet for water, wherein the first transfer pipe is divided into a first part fluidically connected between the outlet of the compressor and the first inlet of the heat exchanger, a second part fluidically connected between the first outlet of the heat exchanger and the first inlet of the humidifier, and a third part fluidically connected between the first outlet of the humidifier and the cathode, and wherein the second transfer pipe is divided into a first part fluidically connected between the cathode and the inlet of the air/water separator, a second part fluidically connected between the first outlet of the air/water separator and the second inlet of the humidifier, a third part fluidically connected between the second outlet of the humidifier and the second inlet of the heat exchanger, and a fourth part fluidically connected between the second outlet of the heat exchanger and the inlet of the turbine.

6. An electricity production system for an aircraft comprising an electric motor, a propeller driven in rotation by the electric motor, electrical conductors electrically supplying the electric motor, a hydrogen source and an oxygen source, wherein said electricity production system comprises:

a fuel cell with an anode and a cathode, and in which the fuel cell is configured to electrically supply the electrical conductors, a first feed pipe fluidically connected to the anode and configured to be fluidically connected to the hydrogen source, an additional electric motor, a compressor whose rotating part is driven in rotation by the additional electric motor, a second feed pipe fluidically connected to an inlet of the compressor and configured to be fluidically connected to the oxygen source, a first transfer pipe fluidically connected between an outlet of the compressor and the cathode, a valve configured to assume different positions between an open position and a closed position, an upstream pipe fluidically connected between the outlet of the compressor and the valve, a downstream pipe fluidically connected between the valve and an air outlet, and a controller configured to control a position of the valve and a flow rate of the compressor, wherein the controller is configured to control the position of the valve and the flow rate of the compressor, according to, alternatively, a first operating mode in which the valve is closed and the flow rate of the compressor corresponds to a flow rate required for supplying oxygen to the fuel cell; or a second operating mode in which the flow rate of the compressor is equal to the flow rate required for supplying oxygen to the fuel cell, supplemented by an additional oxygen flow rate, and the valve is open so that the additional oxygen flow rate is discharged through the valve, a turbine, a transmission shaft fixed between the rotating part of the compressor and the rotating part of the turbine, and a second transfer pipe fluidically connected between the cathode and the inlet of the turbine, and wherein the downstream pipe is divided into a first downstream pipe fluidically connected between the valve and the inlet of the turbine and a second downstream pipe fluidically connected between the outlet of the turbine and the air outlet, a flow meter in communication with the controller and arranged at the outlet of the compressor or at the inlet of the turbine, and wherein the turbine has a variable injection cross section at its inlet.

7. An aircraft comprising an electric motor, a propeller driven in rotation by the electric motor, electrical conductors electrically supplying the electric motor, a hydrogen source, an oxygen source, and an electricity production system according to claim 1.

* * * * *